(12) United States Patent
Van Holsteijn et al.

(10) Patent No.: US 12,446,496 B2
(45) Date of Patent: Oct. 21, 2025

(54) METHOD OF APPLYING A FOIL ON AN INCLINED ROOF STRUCTURE

(71) Applicant: BOAL SYSTEMEN B.V., s-Gravenzande (NL)

(72) Inventors: Gerardus Jacobus Maria Van Holsteijn, Wateringen (NL); Danny Johannes Van Paassen, De Lier (NL)

(73) Assignee: BOAL SYSTEMEN B.V., 's-Gravenzande (NL)

( * ) Notice: Subject to any disclaimer, the term of this patent is extended or adjusted under 35 U.S.C. 154(b) by 390 days.

(21) Appl. No.: 18/031,108

(22) PCT Filed: Oct. 12, 2021

(86) PCT No.: PCT/EP2021/078120
§ 371 (c)(1),
(2) Date: Apr. 10, 2023

(87) PCT Pub. No.: WO2022/078990
PCT Pub. Date: Apr. 21, 2022

(65) Prior Publication Data
US 2023/0371446 A1    Nov. 23, 2023

(30) Foreign Application Priority Data
Oct. 13, 2020  (EP) .................................... 20201424

(51) Int. Cl.
*A01G 9/24* (2006.01)
*A01G 9/14* (2006.01)
*E04B 7/16* (2006.01)

(52) U.S. Cl.
CPC ........... *A01G 9/242* (2013.01); *A01G 9/1407* (2013.01); *A01G 9/1476* (2013.01); *E04B 7/163* (2013.01)

(58) Field of Classification Search
CPC .... A01G 9/242; A01G 9/1407; A01G 9/1476; E04B 7/163; E04B 2009/0492;
(Continued)

(56) References Cited

U.S. PATENT DOCUMENTS 4,262,656 A * 4/1981 Esposito ................. A01G 9/243
   47/17
4,915,022 A * 4/1990 Lynch ..................... A01G 9/242
   52/63

(Continued)

FOREIGN PATENT DOCUMENTS

EP   3005857 A1   4/2016
EP   3626047 A1   3/2020
(Continued)

OTHER PUBLICATIONS

International Search Report and Written Opinion for corresponding International Application No. PCT/EP2021/078120 dated Jan. 4, 2022.
(Continued)

*Primary Examiner* — Brian E Glessner
*Assistant Examiner* — Adam G Barlow
(74) *Attorney, Agent, or Firm* — Steven M. Koehler; Westman, Champlin & Koehler, P.A.

(57) ABSTRACT

A method of applying a foil on an inclined roof structure having a ridge beam, a gutter, a plurality of parallel roof bars interconnecting the beam and the gutter and a ventilation opening frame which surrounds an opening that is located between the beam, the gutter and two neighboring bars, comprises: supplying a window frame that fits inside the ventilation opening frame, introducing the window frame within and holding the window frame at a fixed position with respect to the ventilation opening frame, laying a foil onto the roof structure such that it extends at least from the beam (Continued)

to the gutter and covers at least the neighboring roof bars, fixing the foil to the window frame and the ventilation opening frame along respective circumferential edges thereof, cutting the foil between the window frame and the ventilation opening frame, hence forming the window frame including the foil.

15 Claims, 9 Drawing Sheets

(58) Field of Classification Search
CPC . E04B 2002/7479; E04B 9/303; E04D 13/03; Y02A 40/25; E04H 15/18
USPC .......................... 47/17; 52/222, 273, DIG. 17
See application file for complete search history.

(56) References Cited

U.S. PATENT DOCUMENTS

| | | | | |
|---|---|---|---|---|
| 5,410,844 | A * | 5/1995 | Lynch | A01G 9/1476 52/63 |
| 5,655,335 | A * | 8/1997 | Vermeer | E04B 7/163 52/13 |
| 8,695,281 | B2 * | 4/2014 | Dondurur | E04D 13/1606 160/270 |
| 2004/0003536 | A1 * | 1/2004 | Stefan | A01G 9/242 47/17 |
| 2006/0248807 | A1 * | 11/2006 | Penna | A01G 9/241 52/64 |
| 2018/0238043 | A1 * | 8/2018 | Kuramoto | A01G 9/227 |
| 2023/0371446 | A1 * | 11/2023 | Van Holsteijn | A01G 9/1476 |
| 2024/0268283 | A1 * | 8/2024 | Haaring | A01G 9/241 |
| 2024/0423140 | A1 * | 12/2024 | Chavez | A01G 9/1407 |

FOREIGN PATENT DOCUMENTS

| | | |
|---|---|---|
| ES | 2195685 A1 | 12/2003 |
| FR | 2289111 A1 | 5/1976 |
| FR | 2830721 A1 | 4/2003 |
| FR | 2897604 A1 | 8/2007 |
| GB | 2101663 A | 1/1983 |
| JP | H09121692 A | 5/1997 |
| JP | 2005006516 A | 1/2005 |
| JP | 2018019656 A | 2/2018 |
| WO | 2016027926 A1 | 2/2016 |
| WO | 2017153782 A2 | 9/2017 |

OTHER PUBLICATIONS

Office Action in corresponding Japanese patent application serial No. 2023-546388 dated Apr. 15, 2025.

* cited by examiner

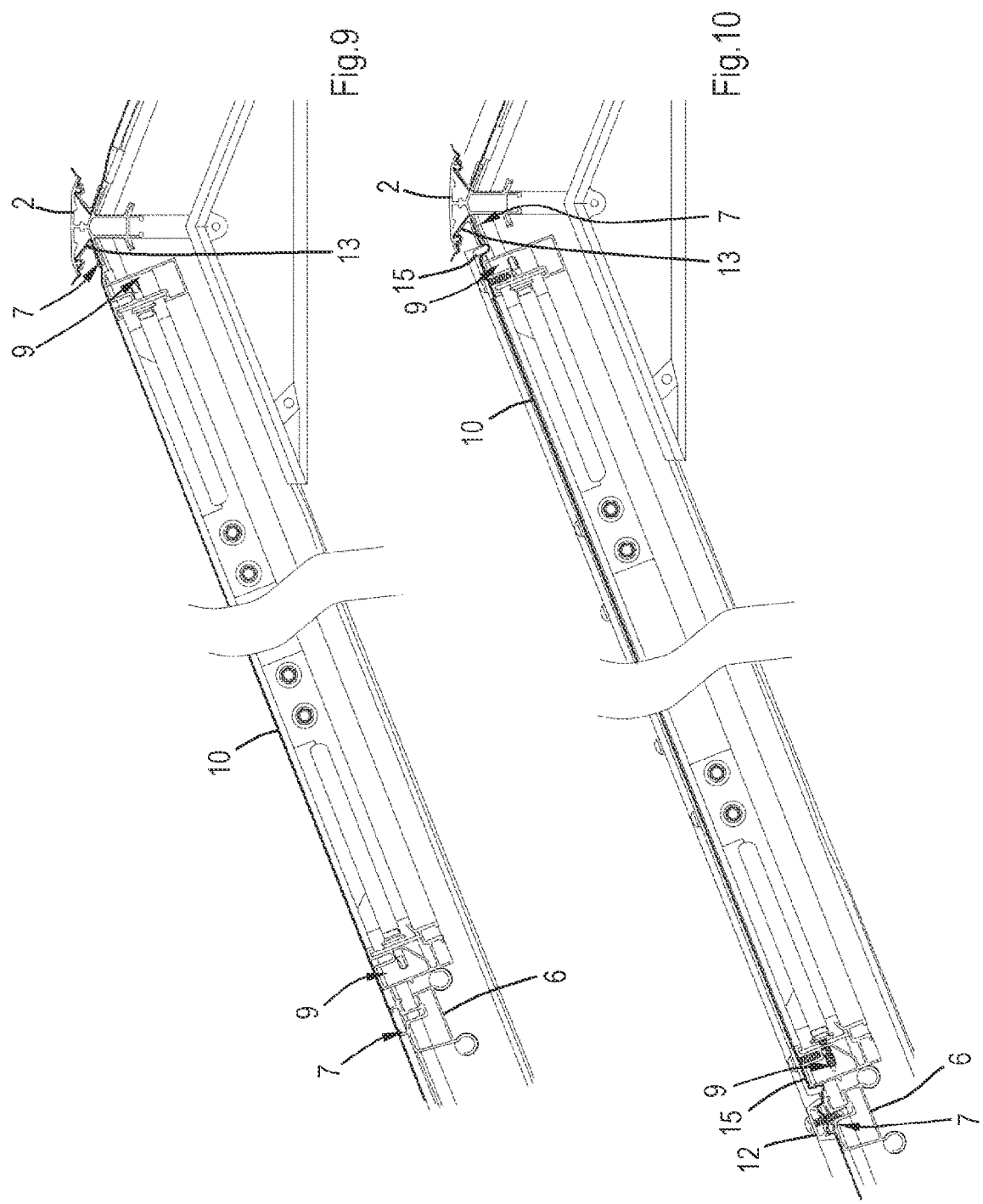

METHOD OF APPLYING A FOIL ON AN INCLINED ROOF STRUCTURE

CROSS-REFERENCE TO RELATED APPLICATION(S)

This application is a Section 371 National Stage Application of International Application No. PCT/EP2021/078120, filed Oct. 12, 2021, and published as WO 2022/078990 A1 on Apr. 21, 2022, and further claims priority to European Patent Application No. 20201424.7, filed Oct. 13, 2020.

BACKGROUND

The present invention relates to a method of applying a foil on an inclined roof structure.

Such a method is known from WO 2017/153782. In the known method a flexible ETFE film is applied to an inclined roof structure of a skeletal structure of a greenhouse. The film is supplied from a roll across two spaced channels. The film is forced into the channels by means of profile elements so as to create tension in the film.

SUMMARY

A method A method of applying a foil on an inclined roof structure, wherein the inclined roof structure comprises a ridge beam, a gutter extending parallel to the ridge beam, a plurality of parallel roof bars interconnecting the ridge beam and the gutter and a ventilation opening frame which surrounds a ventilation opening that is located between the ridge beam, the gutter and two neighboring roof bars, wherein the method comprises the steps of supplying a window frame which is complementary to the ventilation opening frame and fits inside the ventilation opening frame, introducing the window frame within the ventilation opening frame and holding the window frame at a fixed position with respect to the ventilation opening frame, laying a foil onto the inclined roof structure such that it extends at least from the ridge beam to the gutter and covers at least the neighboring roof bars, fixing the foil to the window frame and the ventilation opening frame along respective circumferential edges thereof, cutting the foil between the window frame and the ventilation opening frame, hence forming the window frame including the foil.

Before the step of laying the foil onto the inclined roof structure the ventilation opening frame surrounds the window frame. After the step of cutting, the foil remains fixed to the window frame and the ventilation opening frame, which allows to displace the window frame including the foil with respect to the ventilation opening frame. The window frame may be used immediately as a roof window which can be opened and closed if it is already movably mounted to the ventilation opening frame or it may be further finished before mounting it movably to the ventilation opening frame. The method is time saving, since the foil can be fixed to the window frame and the ventilation opening frame at the same time rather than fixing the foil to the window frame separately. Furthermore, it saves material, since the window frame is not provided with foil separately. It is noted that each of the ridge beam, the gutter, the roof bars, the ventilation opening frame and the window frame may be made of extruded aluminium.

In a preferred embodiment the window frame is held at a fixed position such that neighboring upper surfaces of the window frame and the ventilation opening frame are substantially flush or such that a height difference between neighboring upper surfaces of the window frame and the ventilation opening frame is smaller than the thickness of the window frame, since this provides the opportunity to lay a flat sheet on the neighboring upper surfaces of the window frame and the ventilation opening frame and facilitates to fix the foil to both the window frame and the ventilation opening frame along respective surrounding edges thereof. The height difference may be less than 50% or even less than 25% of the thickness, for example.

In a practical embodiment, in the step of fixing the foil it is also fixed to the ridge beam, the gutter and the roof bars.

The foil may be tensioned before or during the step of fixing in order to obtain a taut cover. It is advantageous if upper surfaces of the inclined roof structure which support the foil after the step of laying the foil thereon are more or less flush, since it makes tensioning of the foil relatively easy.

The ventilation opening frame may be rectangular and formed by an upper beam, a lower beam and two side beams interconnecting the upper beam and the lower beam.

In a particular embodiment the side beams are at least portions of the respective neighboring roof bars, which is an efficient structure when compared to separate side beams.

In another particular embodiment the upper beam is part of the ridge beam, which means that the application of a separate upper beam can be avoided.

The lower beam may interconnect the neighboring roof bars and intersect them at locations between the ridge beam and the gutter. This means that the ventilation opening extends in a part of the area between the ridge beam, the neighboring roof bars and the gutter.

In a particular embodiment the window frame including the foil is an intermediate window insert, which is taken out from the ventilation opening frame after the step of cutting, after which a first hinge portion is mounted to the intermediate window insert so as to form a roof window and a second hinge portion is mounted to the ventilation opening frame, after which the roof window is mounted to the ventilation opening frame through engaging the first and second hinge portions to each other such that the roof window is pivotable with respect to the ventilation opening frame between an open position and a closed position. An advantage of this embodiment is that the intermediate window insert is manufactured during the steps of laying and fixing the foil, after which the intermediate window insert and the ventilation opening frame are provided with the first and second hinge portions, respectively. This provides the opportunity to locate the roof window at a location with respect to the ventilation opening frame in which the location of the window frame is different than before the step of cutting, for example at a higher level.

More specifically, at least one of the intermediate window insert and the ventilation opening frame may be provided with a finishing edge such that the roof window rests on top of the ventilation opening frame in its closed condition. The finishing edge may be provided with sealing means, for example.

The first hinge portion may be a first profiled elongate section, whereas the second hinge portion is a second profiled elongate section that is mounted to the ridge beam. Such elongate sections may be made of extruded aluminium, for example.

The inclined roof structure may be part of a gable roof structure of a greenhouse and/or the foil may be a transparent foil.

In a particular embodiment the greenhouse has a double gable roof structure comprising two similar inclined roof structures including two ridge beams and one gutter extending between the two ridge beams, wherein the foil has such a width that after the step of laying it covers both inclined roof structures, after which it is first fixed to the ridge beams and then fixed to the gutter. This facilitates tensioning of the foil before fixing it to the gutter.

In another embodiment the gable roof structure comprises two similar inclined roof structures including two gutters and one ridge beam extending between the two gutters, wherein the foil has such a width that after the step of laying it covers both inclined roof structures, after which it is first fixed to the gutters and then fixed to the ridge beam. The ridge beam may be lifted before fixing the foil to the ridge beam in order to tension the foil.

BRIEF DESCRIPTION OF THE DRAWINGS

Aspects of the invention will hereafter be elucidated with reference to very schematic drawings illustrating embodiments of the invention by way of example.

FIG. 9 is a cross-sectional view of a part of the roof structure as shown in FIG. 6, showing a situation after the step of laying the transparent foil onto the roof structure, but before the step of fixing.

FIG. 10 is a similar view as FIG. 9, but showing a situation after the step of fixing the transparent foil to the roof structure.

DETAILED DESCRIPTION OF THE ILLUSTRATIVE EMBODIMENTS

Figure 1:
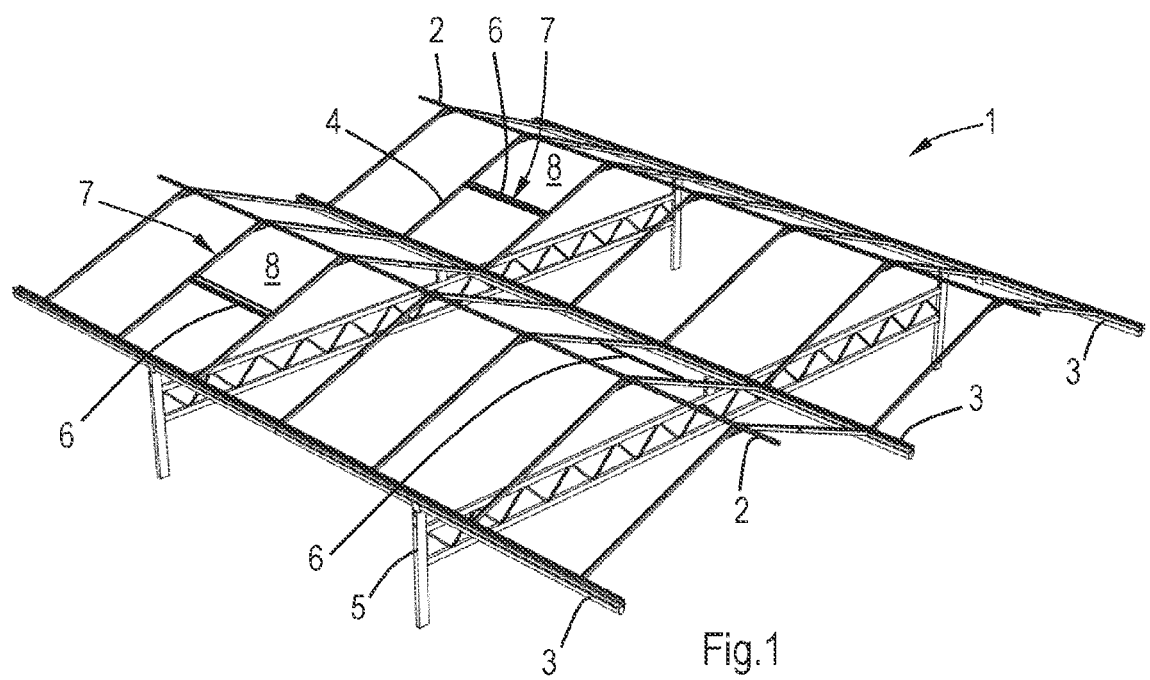
FIG. 1 is a perspective view of a part of a roof structure of a greenhouse under construction.

FIG. 1 shows a part of a roof structure 1 of a greenhouse under construction, in this case a double gable roof structure. A greenhouse including a gable roof shape is also known as a Venlo type greenhouse. The part of the roof structure 1 as shown in FIG. 1 comprises two ridge beams 2 and three gutters 3 which extend parallel to the ridge beams 2. A plurality of parallel roof bars 4 are located between each neighboring ridge beam 2 and gutter 3 and connect them to each other. The roof bars 4 extend perpendicularly to the ridge beams 2 and the gutters 4. The roof structure 1 is supported by pillars 5. The roof structure 1 has four inclined planes; each of them may be considered as being an inclined roof structure according to the present invention, which inclined roof structure comprises a ridge beam 2, a gutter 3 and a plurality of roof bars 4.

The roof structure 1 is provided with a plurality of purlins 6. Each of the purlins 6 interconnects two neighboring roof bars 4 and intersects them at locations between the ridge beam 2 and the gutter 3 which in turn are interconnected by the two neighboring roof bars 4. In FIG. 1 the locations are halfway between the ridge beam 2 and the gutter 3, but this may be different. The purlin 6 together with a portion of the ridge beam 2 and respective portions of the neighboring roof bars 4 form a rectangular ventilation opening frame 7 which surrounds a ventilation opening 8. The portion of the ridge beam 2 forms an upper beam, the purlin 6 forms a lower beam and the portions of the neighboring roof bars 4 form respective side beams of the ventilation opening frame 7. The ventilation opening 8 is located between the ridge beam 2, the gutter 3 and the two neighboring roof bars 4, more specifically between the ridge beam 2, the purlin 6 and the two neighboring roof bars 4. FIG. 1 shows four ventilation openings 8, but alternative variants may have a different number.

Figure 2:
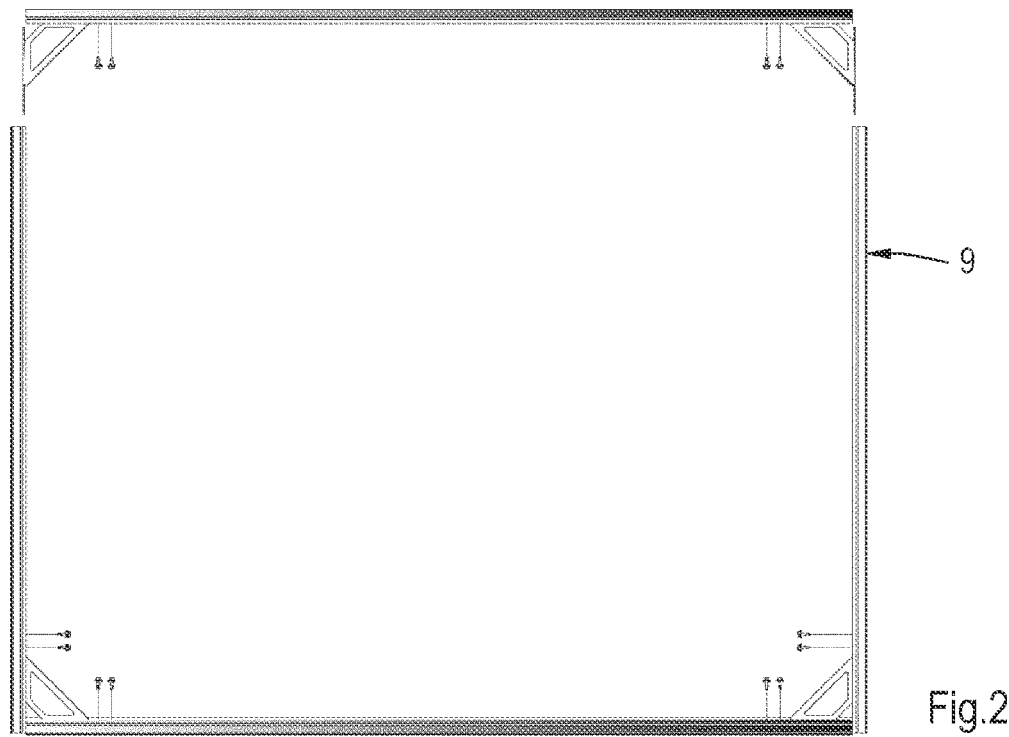
FIG. 2 is an exploded plan view of a window frame.
Figure 3:
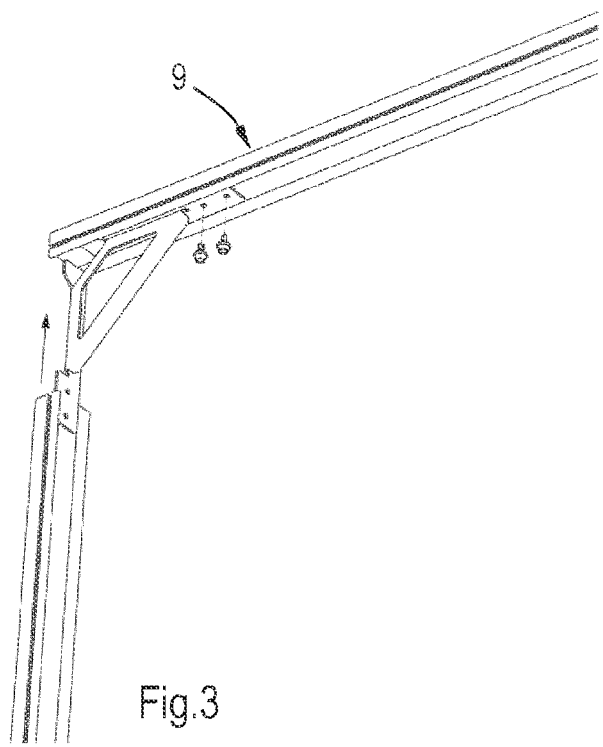
FIG. 3 is a perspective exploded view of a part of the window frame as shown in FIG. 2.
Figure 4:
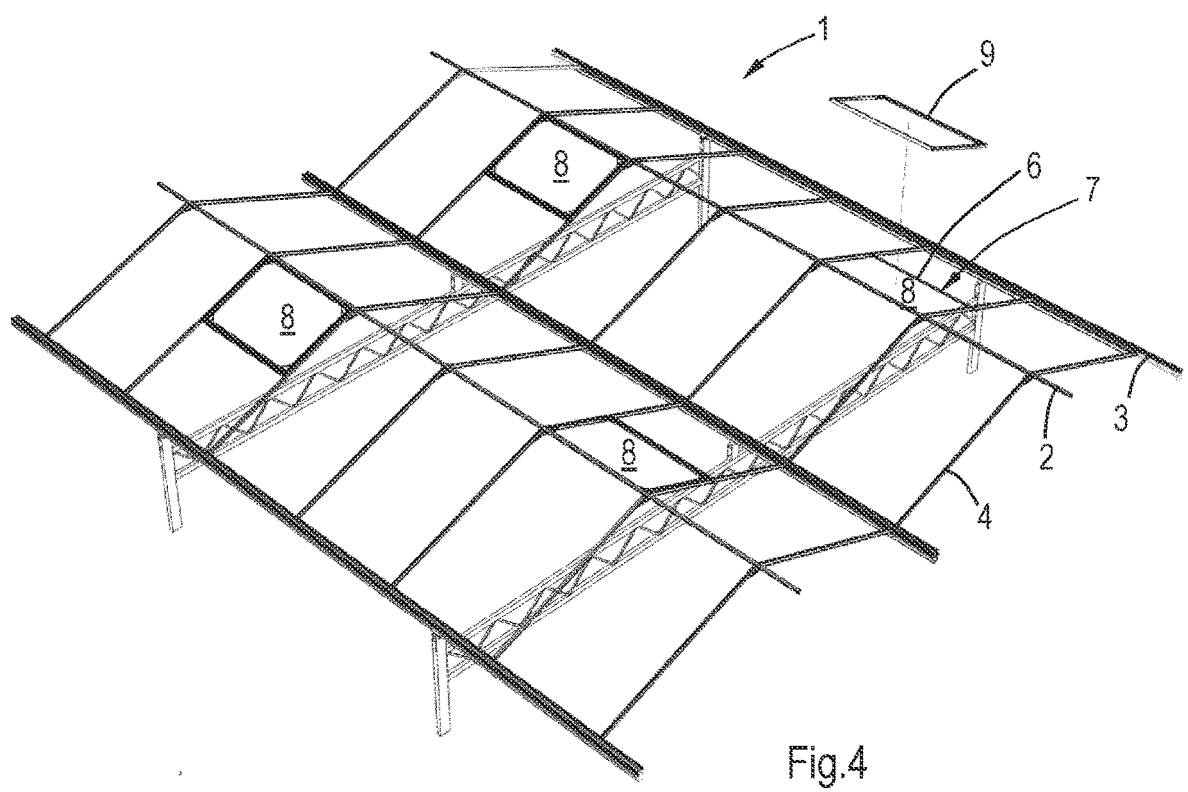
FIG. 4 is a similar view as FIG. 1, illustrating a step of introducing window frames as shown in FIGS. 2 and 3 within respective ventilation opening frames.
Figure 5:
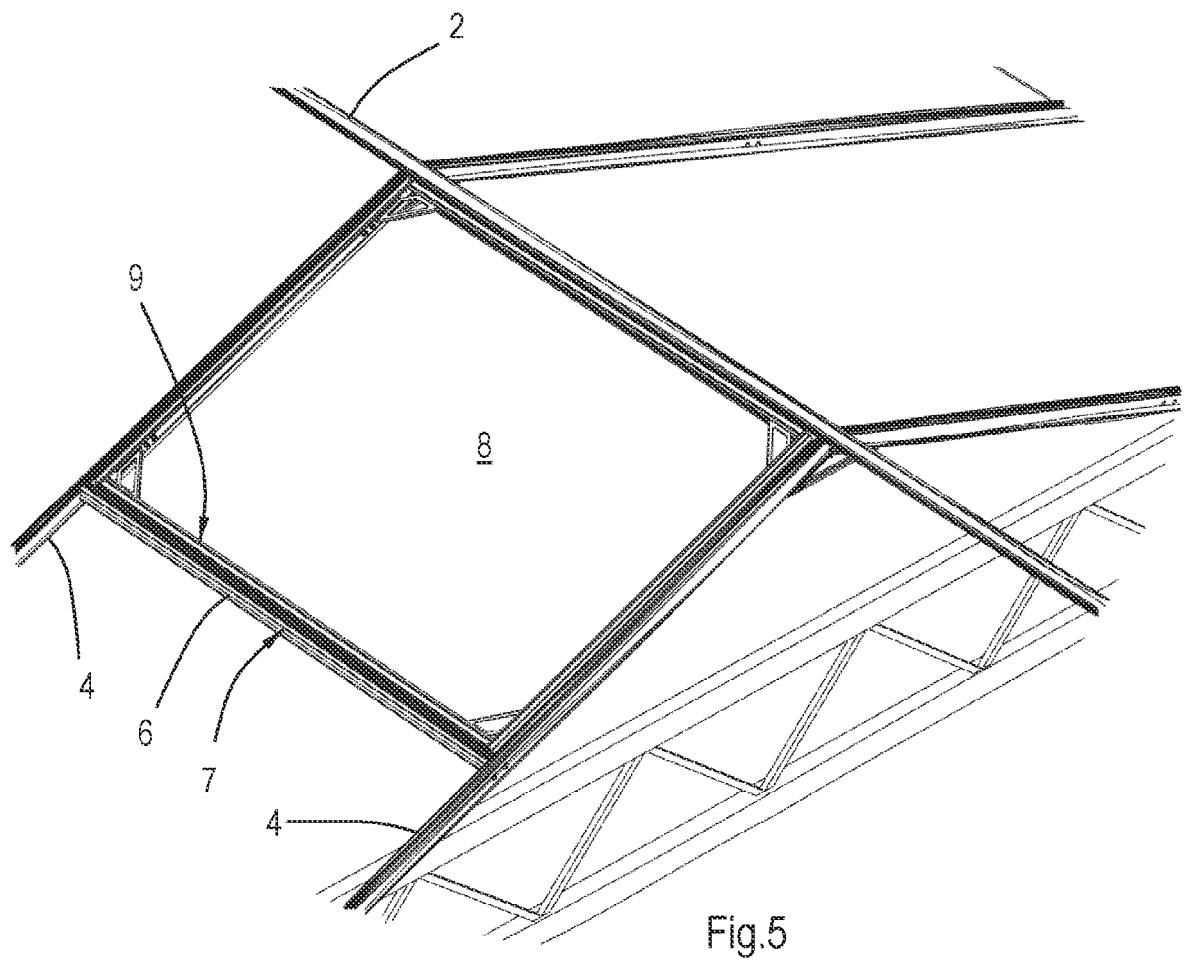
FIG. 5 is a similar view as FIG. 4, showing an enlarged part thereof.

FIG. 4 shows a window frame 9 which is complementary to the ventilation opening frame 7 and which fits inside the ventilation opening frame 7. FIGS. 2 and 3 illustrate a possible manner of manufacturing the window frame 9 from four bars which are fixed to each other through gussets. In a step of the method the window frame 9 is introduced within the ventilation opening frame 7 and held at a fixed position with respect to the ventilation opening frame 7. In the embodiment as shown in FIG. 4 the window frame 9 is held at a fixed position such that neighboring upper surfaces of the window frame 9 and the ventilation opening frame 7 are substantially flush or the height difference between neighboring upper surfaces is at least small. In the situation as shown in FIG. 4 three window frames 9 are already accommodated within the respective ventilation opening frames 7 and one window frame 9 is still outside the corresponding ventilation opening frame 7. FIG. 5 shows in more detail a situation in which the window frame 9 is introduced within the ventilation opening frame 7. The fixed positions of the window frames 9 with respect to the corresponding ventilation opening frames 7 can be created by temporarily clamping the window frames 9 to the ventilation opening frames 7, for example, but numerous alternative manners are conceivable. For example, temporarily screwing, gluing, lacing, bolting or the like.

Figure 6:
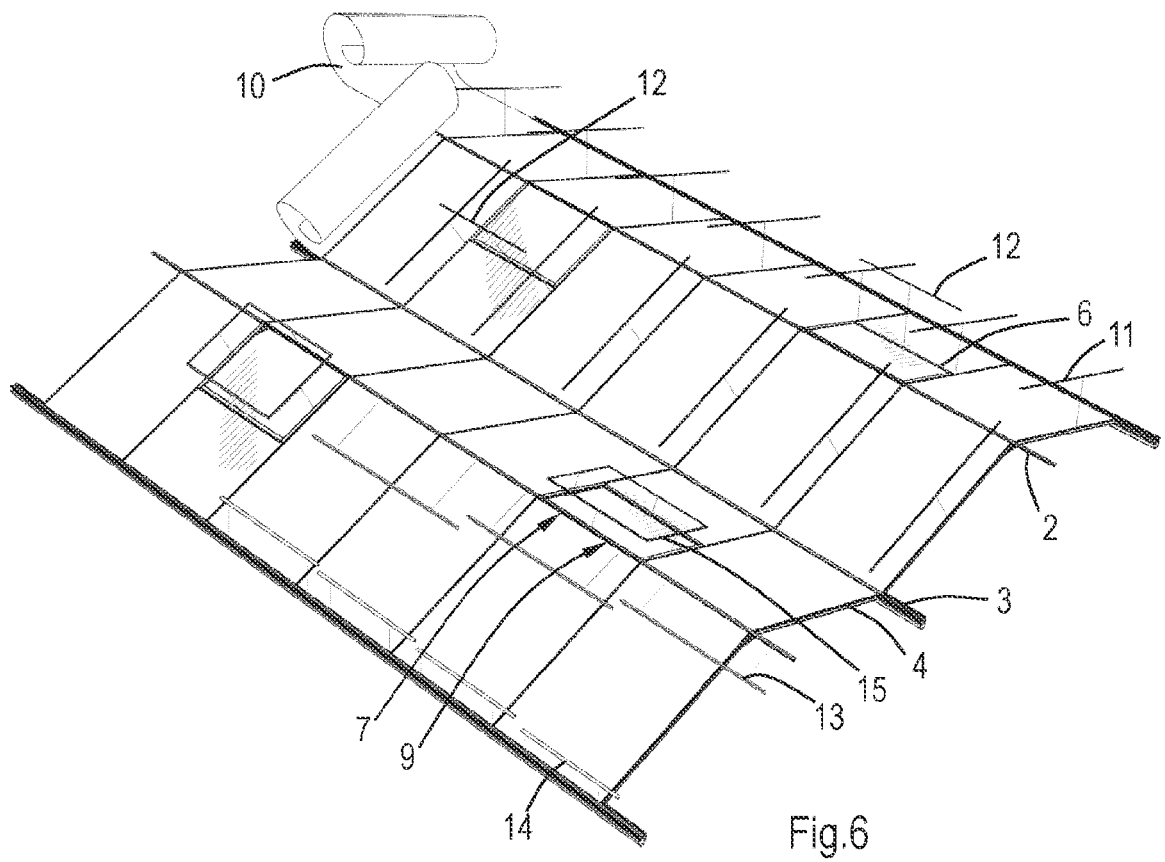
FIG. 6 is a similar view as FIG. 4, illustrating steps of laying a transparent foil onto the roof structure and fixing the transparent foil to the window frames and the ventilation opening frames.

FIG. 6 illustrates a next step in an embodiment of the method in which step a transparent foil 10 is laid onto the roof structure 1. In the embodiment as shown in FIG. 6 the transparent foil 10 is supplied from a roll. The width of one roll is such that the transparent foil 10 covers the roof structure from one of the gutters 3 to one of the neighboring ridge beams 2 thereof. Hence, in the case as shown in FIG. 6 four strips of the transparent foil 10 are applied to cover the roof structure 1.

Figure 7:
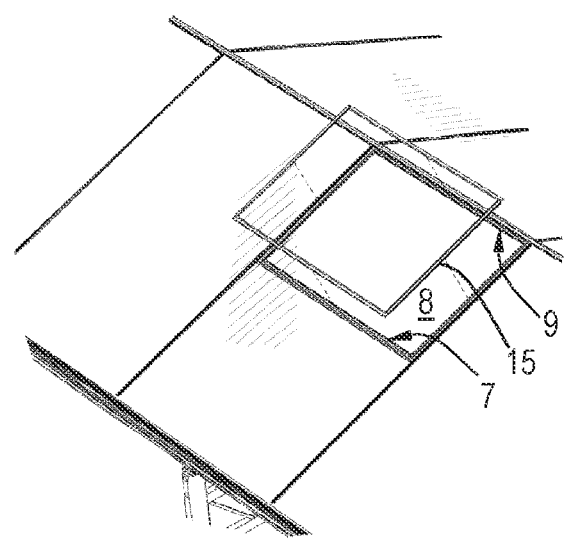
FIGS. 7 and 8 are similar views as FIG. 6, showing enlarged parts thereof.
Figure 8:
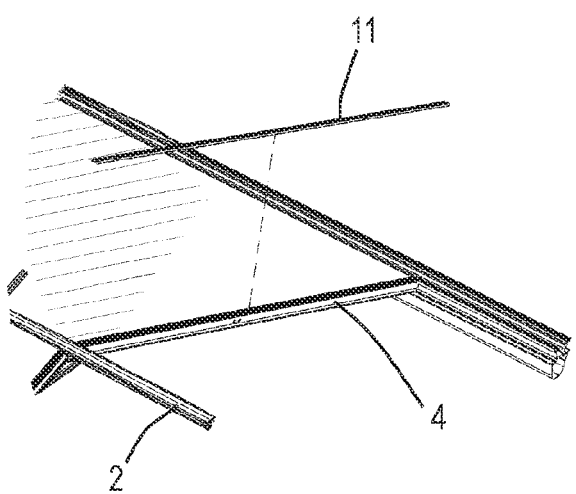

In a next step the transparent foil 10 is fixed to the roof structure 1. Before the step of fixing the transparent foil 10 may be tensioned. FIG. 6 shows that the transparent foil 10 is fixed to the roof bars 4 by means of respective roof bar strips 11, to the purlins 6 by means of respective purlin strips 12 and to the ridge beams 2 by means of ridge beam strips 13. Consequently, the transparent foil 10 is fixed to the ventilation opening frames 7. The transparent foil 10 is also fixed to the gutters 3 by means of gutter strips 14. Furthermore, the transparent foil 10 is fixed to the window frames 9 by means of respective rectangular window frame fastenings 15. It is noted that for explanatory reasons only a part of the roof bar strips 11, the purlin strips 12, the ridge beam strips 13, the gutter strips 14 and the window frame fastenings 15 are shown in FIG. 6. FIGS. 7 and 8 show details of FIG. 6 on a larger scale. The mentioned strips 11-14 and the window frame fastenings 15 may be fixed by screws, clamping means, snap fit means, or the like. It is noted that the mentioned strips 11-14 and the window frame fastenings 15 may be made of aluminium, PVC, rubber or the like. It is also possible that the mentioned strips 11-14 and the ribs of the window frame fastenings 15 have identical cross-sections.

FIGS. 9 and 10 show in detail how the transparent foil 10 is fixed at the window frame 9 and the ventilation opening frame 7. It can be seen that the ventilation opening frame 7 surrounds the window frame 9. FIG. 9 shows that the transparent foil 10 is already fixed to the ridge beam 2 through the ridge beam strips 13. Hence, it is already fixed to a portion of the ventilation opening frame 7. FIG. 9 also shows that that an upper surface of the purlin 6 and a neighboring upper surface of the window frame 9 are flush, whereas an upper surface of the ridge beam 2 and a neighboring upper surface of the window frame 9 have a small height difference. However, the height difference is relatively small, in this case smaller than 25% of the thickness of the window frame 9. FIG. 10 shows that the window frame fastening 15 is fixed to the window frame 9 and the purlin strip 12 is fixed to the purlin 6.

Figure 11:
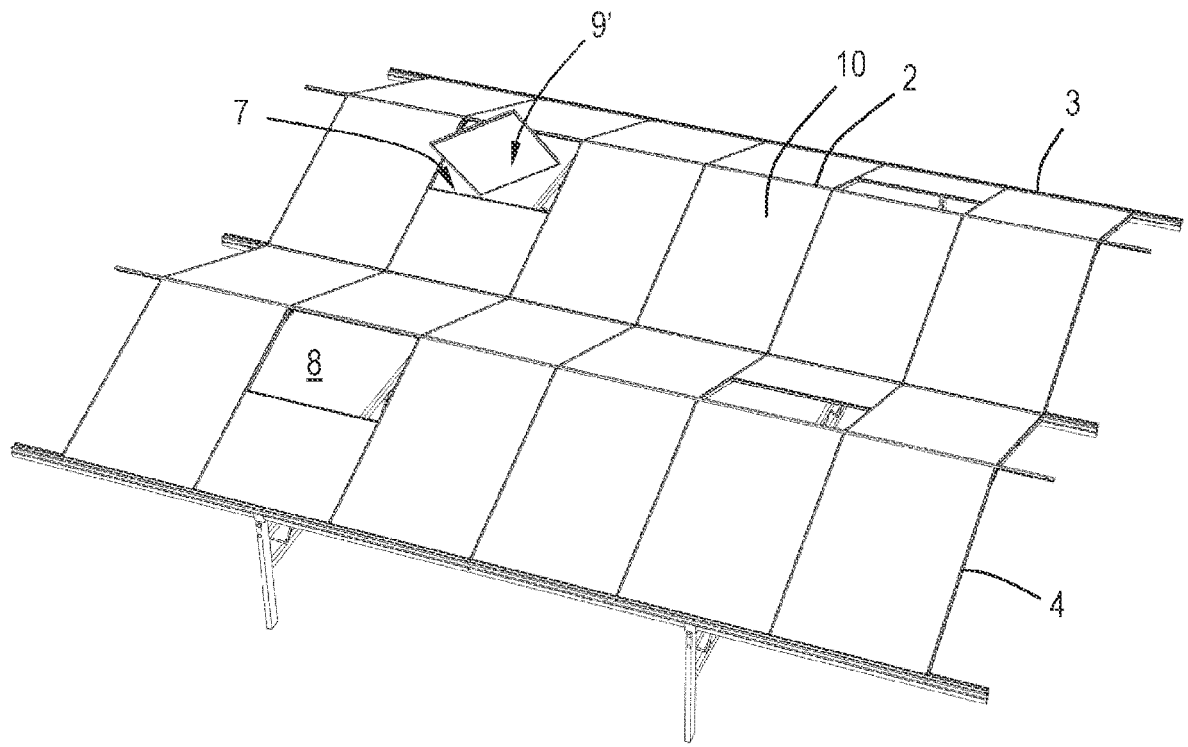
FIG. 11 is a similar view as FIG. 6, illustrating a step of taking out one of the window frames including the foil in an embodiment of the method.
Figure 12:
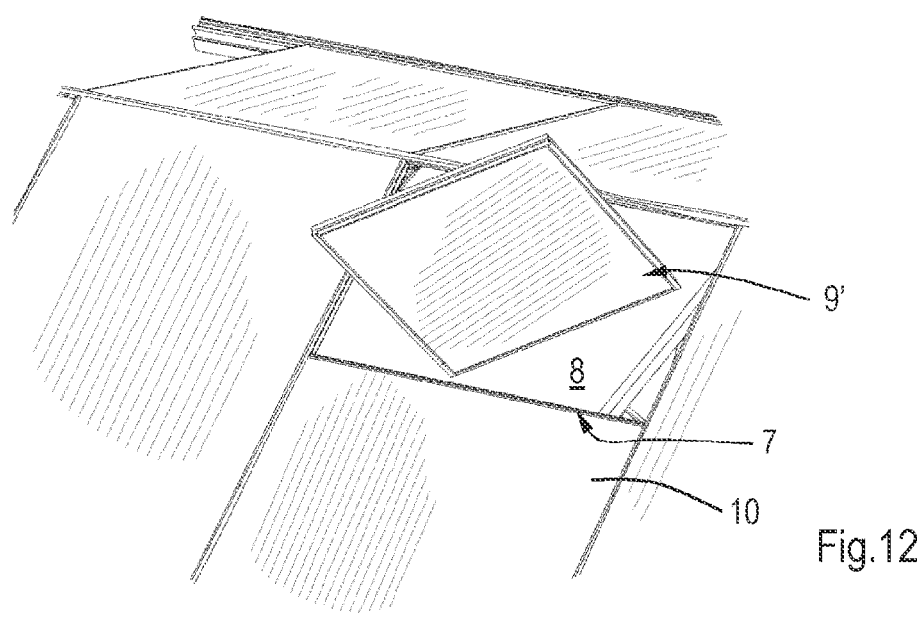
FIG. 12 is a similar view as FIG. 11, showing an enlarged part thereof.

After the step of fixing the transparent foil 10 to the roof structure 1, hence also to the window frames 9 and the ventilation opening frames 7 along respective circumferential edges thereof, the transparent foil 10 between the window frames 9 and the corresponding ventilation opening frames 7 is cut. Subsequently, the window frames 9 including the respective transparent foil 10 and window frame fastenings 15, now mentioned intermediate window inserts and indicated by reference number 9' in the figures, are taken out from the ventilation opening frames 7, see FIGS. 11 and 12.

Figure 13:
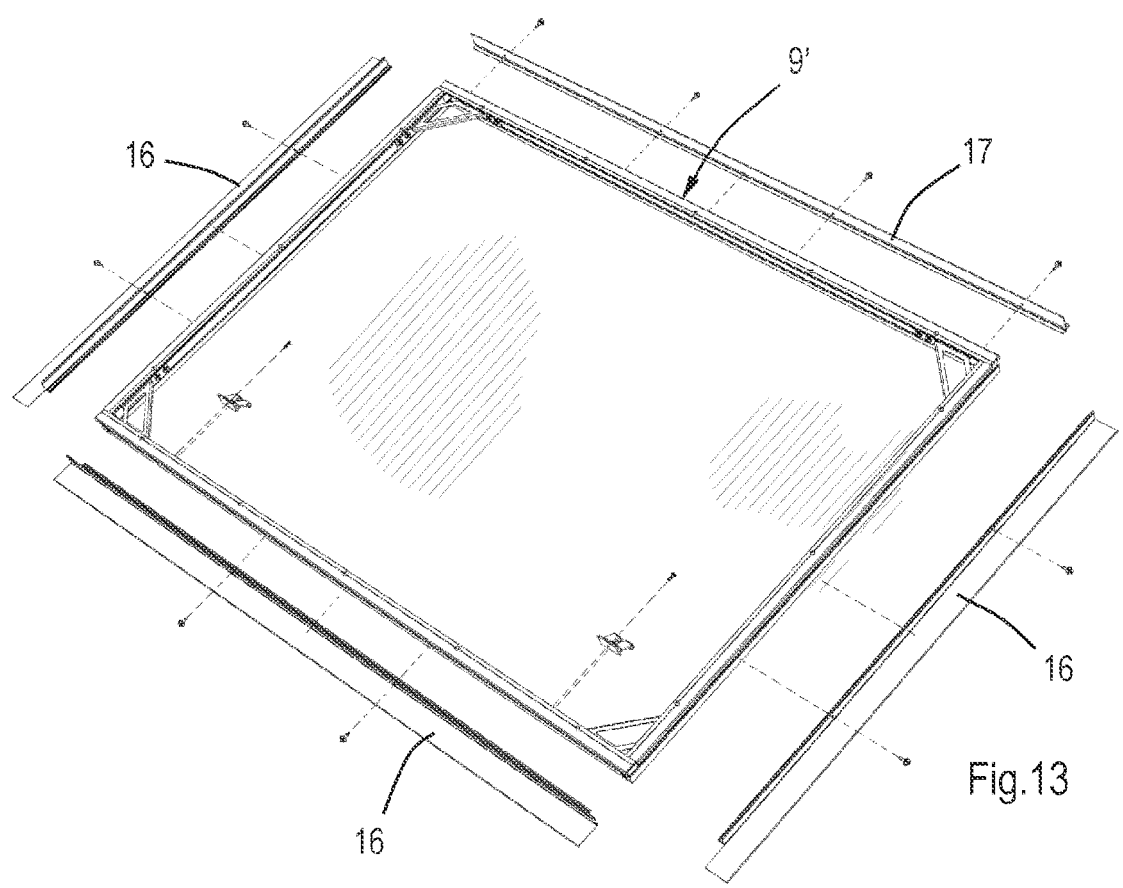
FIG. 13 is a perspective view of one of the window frames being provided with transparent foil, illustrating a finishing step in an embodiment of the method so as to form a roof window.
Figure 14:
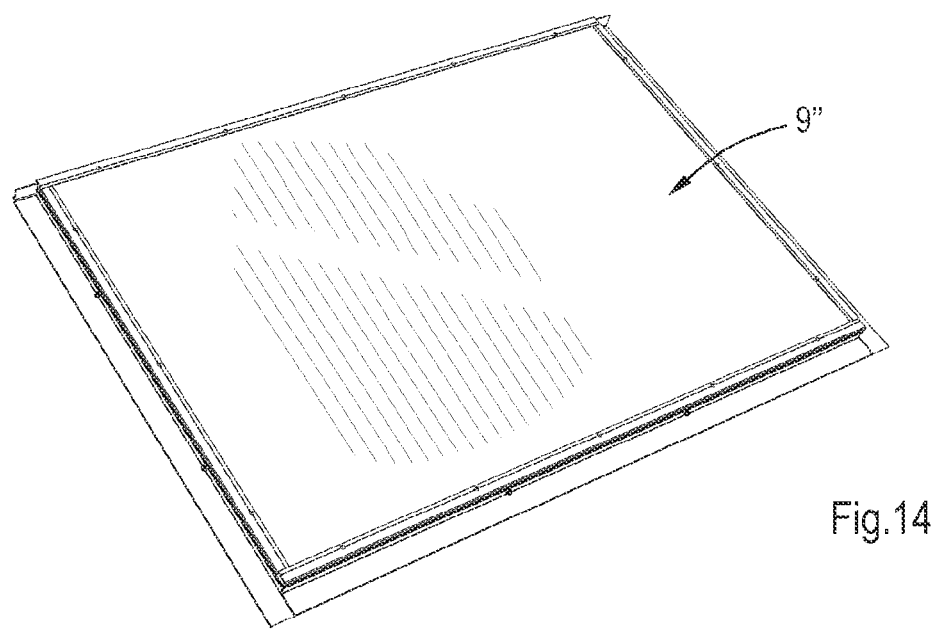
FIG. 14 is a similar view as FIG. 13, showing the resulting roof window.

Then, each of the intermediate window inserts 9' is provided with a finishing edge in the form of border strips 16 at three outer edges thereof and a first hinge portion in the form of a window hinge strip 17 at one outer edge thereof, which is shown in FIG. 13. This results in a roof window 9" as shown in FIG. 14.

Figure 15:
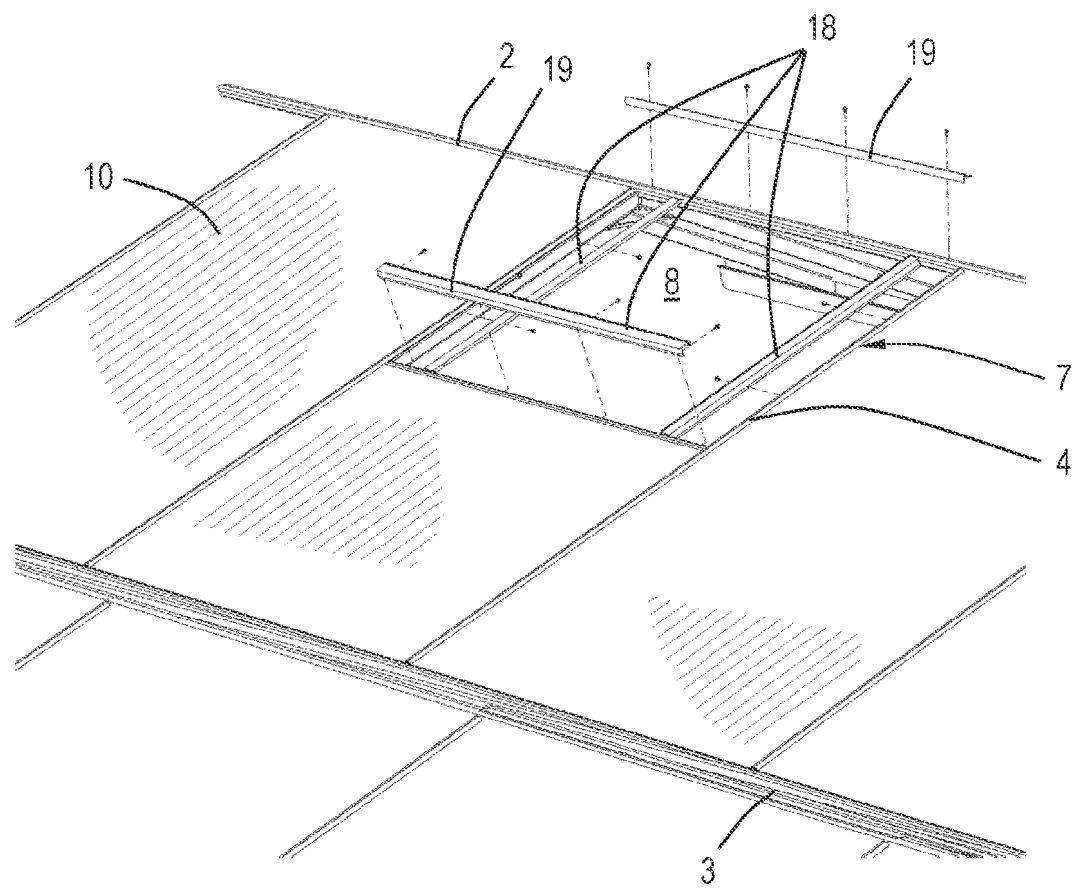
FIG. 15 is a similar view as FIG. 12, illustrating a finishing step at one of the ventilation opening frames in an embodiment of the method.
Figure 16:
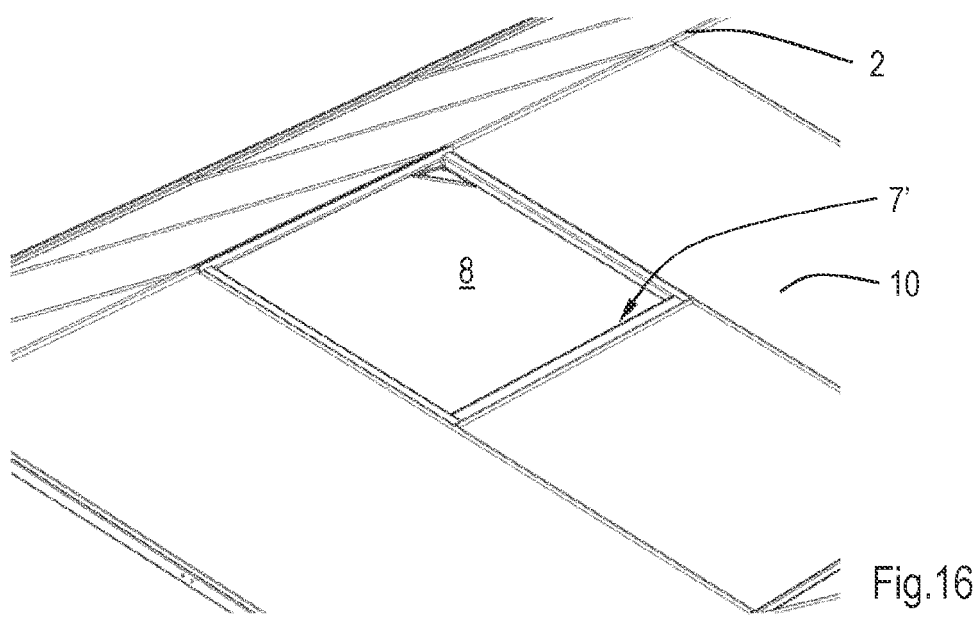
FIG. 16 is a similar view as FIG. 15, showing the resulting ventilation opening frame.
Figure 18:
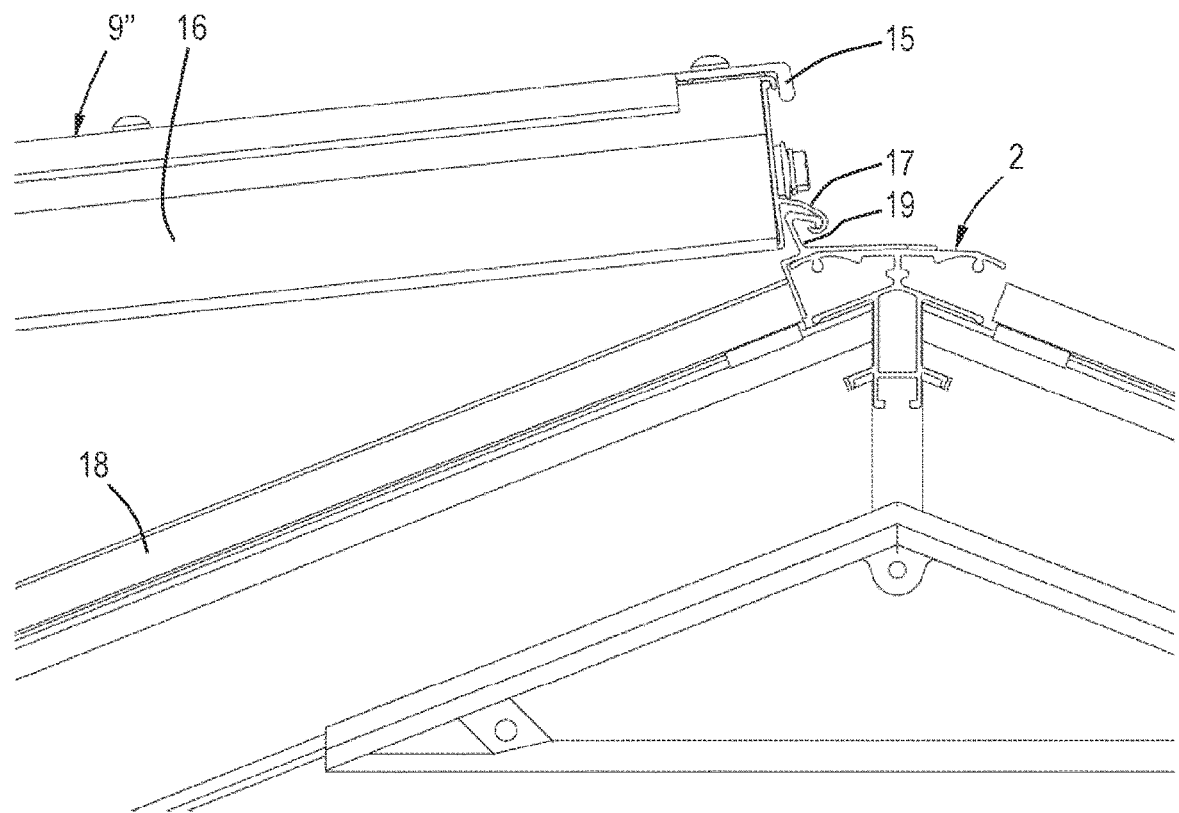
FIG. 18 is a cross-sectional view of a part of the resulting roof structure as shown in FIG. 17, in which the foil is not shown for explanatory reasons.

The ventilation opening frame 7 is also provided with a finishing edge in the form of border strips 18 at three sides thereof and a second hinge portion in the form of a ventilation opening hinge strip 19, see FIG. 15. The ventilation opening hinge strip 19 is fixed to the remainder of the ridge beam 2, see FIG. 18. A resulting bordered ventilation opening frame is shown in FIG. 16 and indicated by reference number 7'. The window hinge strip 17 and the ventilation opening hinge strip 19 are first and second cooperating profiled elongate sections, respectively, which engage each other when mounting the roof window 9" to the bordered ventilation opening frame 7' such that the roof window 9" is pivotable with respect to the bordered ventilation opening frame 7' between an open position and a closed position. The finishing edges of the roof windows 9" and the respective bordered ventilation opening frames 7' are such that when the roof windows 9" are pivotally mounted to the respective bordered ventilation opening frames 7' the roof window 9" rests on top of the bordered ventilation opening frame 7' in its closed condition. It can be derived from FIG. 18 that the window frame 9 within the roof window 9" has a higher position with respect to the ventilation opening frame 7 in closed condition of the roof window 9" than before laying the foil on the roof structure 1.

Figure 17:
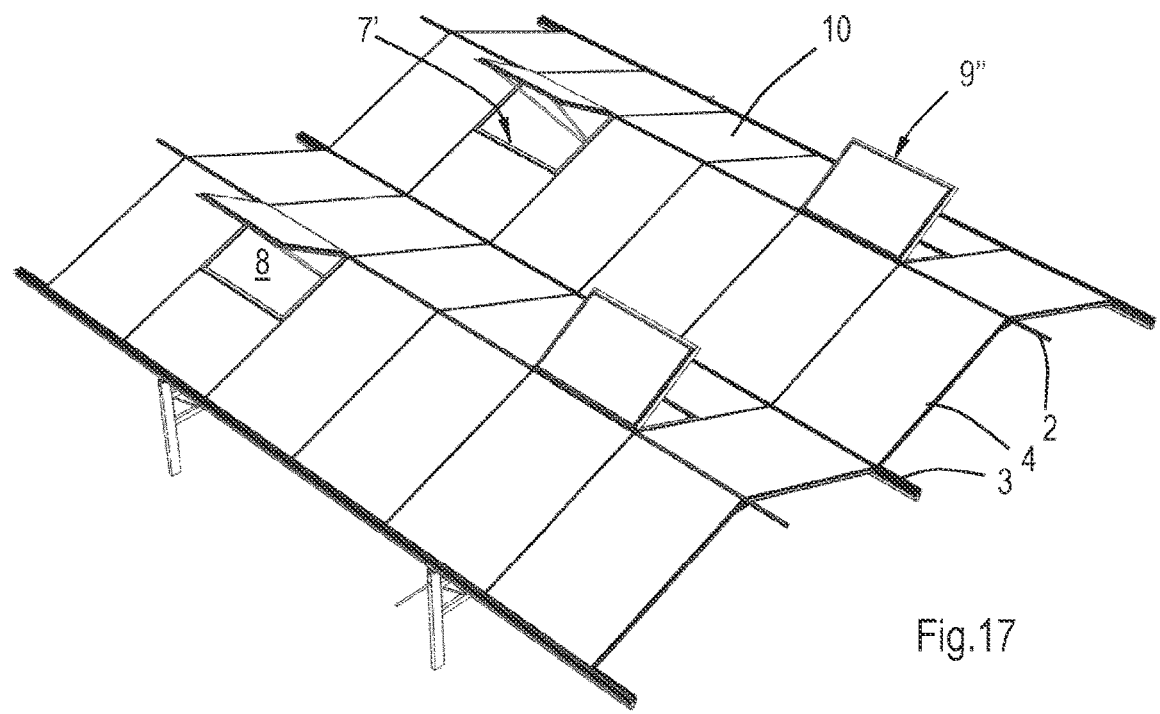
FIG. 17 is a similar view as FIG. 1, but showing the resulting roof structure including the roof windows and being covered with transparent foil.

The roof windows 9" may be coupled to a mechanism for opening and closing the roof windows 9". FIG. 17 shows the resulting double gable roof of the greenhouse in a situation in which the roof windows 9" are in an open position.

The invention is not limited to the embodiments shown in the drawings and described hereinbefore, which may be varied in different manners within the scope of the claims and their technical equivalents. For example, the window frame may be adapted such that it remains within the ventilation opening frame after cutting the transparent foil. In that case the window frame and the ventilation opening frame may already be pivotally mounted to each other before applying the transparent foil. Furthermore, the invention is also applicable to an alternative roof structure, for example comprising a single inclined roof structure including a ridge beam, a gutter and a plurality of parallel roof bars instead of a gable roof structure or a double gable roof structure.

The invention claimed is:

1. A method of applying a foil on an inclined roof structure, wherein the inclined roof structure comprises a ridge beam, a gutter extending parallel to the ridge beam, a plurality of parallel roof bars interconnecting the ridge beam and the gutter and a ventilation opening frame which surrounds a ventilation opening that is located between the ridge beam, the gutter and two neighboring roof bars, wherein the method comprises:
   supplying a window frame which is complementary to the ventilation opening frame and fits inside the ventilation opening frame,
   introducing the window frame within the ventilation opening frame and holding the window frame at a fixed position with respect to the ventilation opening frame,
   laying a foil onto the inclined roof structure such that it extends at least from the ridge beam to the gutter and covers at least the neighboring roof bars,
   fixing the foil to the window frame and the ventilation opening frame along respective circumferential edges thereof,
   cutting the foil between the window frame and the ventilation opening frame, hence forming the window frame including the foil.

2. The method according to claim 1, wherein the window frame is held at a fixed position such that neighboring upper surfaces of the window frame and the ventilation opening frame are substantially flush or such that a height difference between neighboring upper surfaces of the window frame and the ventilation opening frame is smaller than a thickness of the window frame.

3. The method according to claim 1, wherein fixing the foil it is also fixed to the ridge beam, the gutter and the roof bars.

4. The method according to claim 1, wherein the foil is tensioned before or during fixing the foil.

5. The method according to claim 1, wherein the ventilation opening frame is rectangular and formed by an upper beam, a lower beam and two side beams interconnecting the upper beam and the lower beam.

6. The method according to claim 5, wherein the side beams are at least portions of the respective neighboring roof bars.

7. The method according to claim 5, wherein the upper beam is part of the ridge beam.

8. The method according to claim 6, wherein the lower beam interconnects the neighboring roof bars and intersects them at a location between the ridge beam and the gutter.

9. The method according to claim 1, wherein the window frame including the foil is an intermediate window insert, which is taken out from the ventilation opening frame after cutting the foil, after which a first hinge portion is mounted to the intermediate window insert so as to form a roof window and a second hinge portion is mounted to the ventilation opening frame, after which the roof window is mounted to the ventilation opening frame through engaging the first and second hinge portions to each other such that the roof window is pivotable with respect to the ventilation opening frame between an open position and a closed position.

10. The method according to claim 9, wherein at least one of the intermediate window insert and the ventilation opening frame is provided with a finishing edge such that the roof window rests on top of the ventilation opening frame in its closed condition.

11. The method according to claim 9, wherein the ventilation opening frame is rectangular and formed by an upper beam, a lower beam and two side beams interconnecting the upper beam and the lower beam, wherein the upper beam is part of the ridge beam, and wherein the first hinge portion is a first profiled elongate section and the second hinge portion is a second profiled elongate section that is mounted to the ridge beam.

12. The method according to claim 1, wherein the inclined roof structure is part of a gable roof structure of a greenhouse and/or wherein the foil is a transparent foil.

13. The method according to claim 12, wherein the greenhouse has a double gable roof structure comprising two similar inclined roof structures including two ridge beams and one gutter extending between the two ridge beams, wherein the foil has such a width that after laying the foil it covers both inclined roof structures, after which it is first fixed to the ridge beams and then fixed to the gutter.

14. The method according to claim 12, wherein the gable roof structure comprises two similar inclined roof structures including two gutters and one ridge beam extending between the two gutters, wherein the foil has such a width that after laying the foil it covers both inclined roof structures, after which it is first fixed to the gutters and then fixed to the ridge beam.

15. The method according to claim 14, wherein the ridge beam is lifted before fixing the foil to the ridge beam.

* * * * *